United States Patent
Boltz

[11] Patent Number: 5,915,900
[45] Date of Patent: Jun. 29, 1999

[54] CARGO TIE-DOWN DEVICE

[76] Inventor: Bernard A. Boltz, 161 Wailupe Cir., Honolulu, Hi. 96821

[21] Appl. No.: 09/095,923

[22] Filed: Jun. 12, 1998

[51] Int. Cl.[6] ....................................................... B60P 7/08
[52] U.S. Cl. ............................. 410/110; 410/106; 410/116
[58] Field of Search ................................... 410/106, 110, 410/116, 108, 101; 248/499; 296/43; 24/265 CD, 115 K

[56] References Cited

U.S. PATENT DOCUMENTS

| | | |
|---|---|---|
| 2,051,251 | 8/1936 | Epstein . |
| 2,280,662 | 4/1942 | Pawsat . |
| 3,259,353 | 7/1966 | Webb ........................................ 410/116 |
| 3,351,356 | 11/1967 | Clark et al. . |
| 3,381,925 | 5/1968 | Higuchi ................................... 410/116 |
| 3,421,726 | 1/1969 | Getter . |
| 3,528,691 | 9/1970 | Matrch, Jr. . |
| 3,595,125 | 7/1971 | Jacobs ..................................... 410/106 |
| 3,623,690 | 11/1971 | Bargman . |
| 3,950,010 | 4/1976 | Robertson . |
| 4,191,108 | 3/1980 | Jones ....................................... 410/110 |
| 4,242,021 | 12/1980 | Sloane ....................................... 410/96 |
| 4,316,688 | 2/1982 | Roskelley ................................ 410/102 |
| 4,607,991 | 8/1986 | Porter ...................................... 410/110 |
| 4,657,299 | 4/1987 | Mahan . |
| 4,812,093 | 3/1989 | Millar, Jr. ............................... 410/110 |
| 4,915,556 | 4/1990 | Unger ...................................... 410/110 |
| 4,948,311 | 8/1990 | St. Pierre et al. ...................... 410/107 |
| 4,958,875 | 9/1990 | Zamzow . |
| 5,141,277 | 8/1992 | Alexander . |
| 5,326,203 | 7/1994 | Cockrell ................................. 410/110 |
| 5,738,471 | 4/1998 | Zentner et al. ......................... 410/110 |

*Primary Examiner*—Stephen T. Gordon
*Attorney, Agent, or Firm*—Ralph L. Marzocco

[57] ABSTRACT

A tie-down device has been invented that greatly improves securement of cargoes, loads, and ladings to beds, supports, and pallets. When installed within post receiving wells of beds, supports, and pallets, compressable polymeric material is caused to latitudinally expand in all outwardly directions in response to longitudinally applied compression thereupon by turning of an eyenut member.

10 Claims, 2 Drawing Sheets

CARGO TIE-DOWN DEVICE

BACKGROUND OF THE INVENTION

1. Field of the Invention

The present invention relates to devices to be used for the securement of cargoes, loads, ladings, and the like. More particularly, the invention relates to tie-down devices to be used for the securement of cargoes, loads, ladings, and the like to beds, supports, pallets, and the like.

2. Description of the Prior Art

Representative of the relevant prior art of the subject invention are U.S. Pat. No. 3,421,726 (Getter), U.S. Pat. No. 2,051,251 (Epstein), U.S. Pat. No. 3,528,691 (Matich), and U.S. Pat. No. 2,280,662 (Pawsat).

Of the foregoing references the Getter patent is the most relevant, relating to a wedge shaped truck tie-down structure for disposition into a stake hole of a pickup body whereby a pair of inclined members with a threaded tie-down connector rod that slidably extends through one member and threaded in the other member such that by turning the rod the second member is wedged upward against the opposing adjacent walls of the stake hole.

The other three references relate to wedge shaped devices that are not specifically for truck tie-downs but relate to wedge shaped anchoring devices per se that are very similar to that of the present invention. In fact, the Epstein and Matich references use through extending openings that are larger than the bolt adapted to pass between the wedge shaped blocks.

One shortcoming of current tie-down devices is that cargo subject to immoderate multidirectional movement requires improved securement to the bed inasmuch as the tie-down device may work its way free of the stakehole due to the dynamics of load shifting from transport over rough and twisting land roads and sea lanes.

Another shortcoming of current tie-down devices is that cargo subject to moderate multidirectional movement requires improved securement to the bed as the tie-down device may work its way free of the stakehole due to the dynamics of load shifting from transport over rough and twisting land roads and sea lanes inasmuch as the compressible member of the tie-down device, upon compression, is forced against but two sides of the stakehole.

Yet another shortcoming of current tie-down devices having an expandable wedge member made from hard material is that the device is deformed by the amount of force required for wedge expansion.

Still another shortcoming of current tie-down devices is that the configuration and composition of their wedge member do not provide maximum surface, high friction contact with all sides of the stakehole.

Consequently, a need still exists for improvement of cargo tie-down devices so as to overcome these shortcomings without introducing new ones in their place. It is to the provision of such that the present invention is primarily directed.

SUMMARY OF THE INVENTION

The present invention provides a cargo tie-down device that satisfies the aforementioned need for improvement of known cargo tie-down devices so as to overcome the above-described shortcomings without introducing new ones in their place.

In accordance with the teachings of the present invention, a cargo tie-down device is removably disposable in a post receiving well or stakehole of a cargo bed. The device comprises a generally solid parallelepipedon of a compressable polymeric material that is beveled to define a plurality of movable wedge-shaped members having rhomboid-shaped opposed end walls. The parallelepipedon of compressable polymeric material latitudinally expands in all outwardly directions in response to longitudinally applied compression. In order to facilitate movement of the wedge-shaped members, a compatable lubricant is dispersed between the rhomboid-shaped opposed end walls of the wedge-shaped members.

An eyenut-bolt member for longitudinally compressing the parallelepipedon of compressable polymeric material comprises a threaded shaft with a first plate affixed to one end of the treaded shaft. A second plate with a centrally located round hole is freely movable on the shaft.

A hole which is longitudinally disposed throughout the center of the parallelepipedon of compressable polymeric material accomodates the shaft of the eyenut-bolt member. The diameter of the hole is sufficiently larger than the diameter of the shaft to allow for slippage of the wedge-shaped members along the lubricated end walls whenever longitudinal compression is applied.

The first plate is areally equal to—and alignable with the bottommost end of the parallelepipedon of compressable polymeric material and the post receiving well opening or stakehole of the cargo bed. However, the second plate is areally somewhat larger than the topmost end of the parallelepipedon of compressable polymeric material and is areally somewhat larger than the post receiving well opening or stakehole of the cargo bed. Further, the second plate is disposed on the topmost end of the parallelepipedon of compressable material and is disposed so that the threaded shaft passes through the centrally located hole of the second plate.

The internally threaded eyenut is disposed on the threaded shaft of the eyenut-bolt member and atop the second plate so that a downwardly turning of the eyenut causes a longitudinal compression force to be applied to the second plate which in turn causes an outwardly expansion of the parallelepipedon of compressable polymeric material in the post receiving well or stakehole of the cargo bed.

The primary advantage of present invention of the cargo tie-down device is the attainment of improved securement of cargo subject to moderate or immoderate multidirectional movement inasmuch as the cargo tie-down device is less likely to work its way free of the post receiving well or stakehole caused by the dynamics of load shifting as a result of being transported over rough roads and sea lanes. Additionally, the wedge-shaped members of the present cargo tie-down device composed of compressable polymeric materials, unlike wedgeshaped members composed of non-compressable harder materials, are not irreversibly deformed by forces required for wedge-shaped member expansion. Moreover, the configuration of the wedge-shaped members of the present cargo tie-down device provides increased surface contact with all sides of the post receiving well or stakehole of the cargo bed. These and other advantages and attainments of the present invention will become apparent to those skilled in the art upon a reading of the detailed description when taken with the drawings wherein there is shown and described illustrative embodiments of the present invention.

BRIEF DESCRIPTION OF THE DRAWINGS

For a further understanding of the nature and object of the invention, reference should be had to the detailed description of the exemplary embodiment taken in connection with the appended drawings in which.

DETAILED DESCRIPTION OF THE INVENTION

Figure 1:
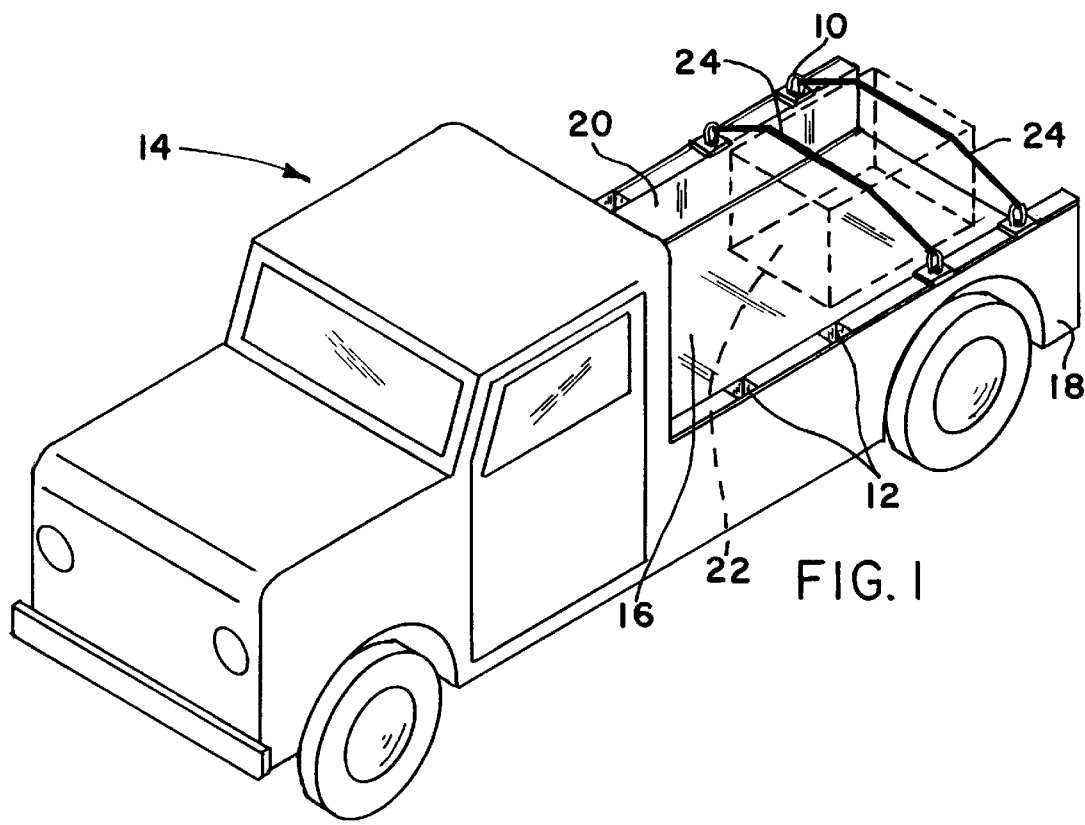
FIG. 1 is a perspective view of a motor vehicle with a phantomly outlined cargo secured in the bed of the motor vehicle by means of straps interconnected to cargo tie-down devices of this invention that are installed in post receiving wells in the side walls of the motor vehicle.

In the following description, like reference characters designate like or corresponding parts throughout the several views of the drawings. Also in the following description, it is to be understood that such terms as "forward", "rearward", "left", "right", "upwardly", "downwardly", and the like, are words of convenience and are not to be construed as limiting terms.

Figure 2:
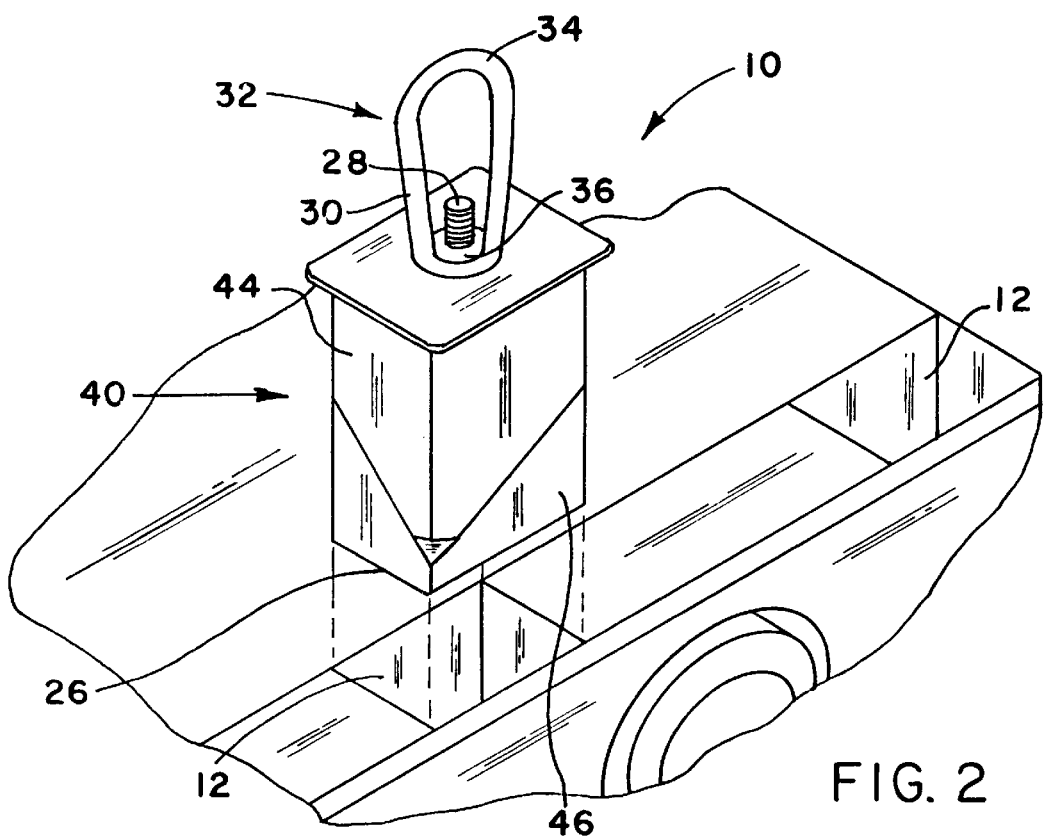
FIG. 2 is a fractional perspective view of a motor vehicle with a perspective view of a cargo tie-down device of this invention shown directly above and ready for insertion into a post receiving well in the side walls of the motor vehicle.
Figure 3:
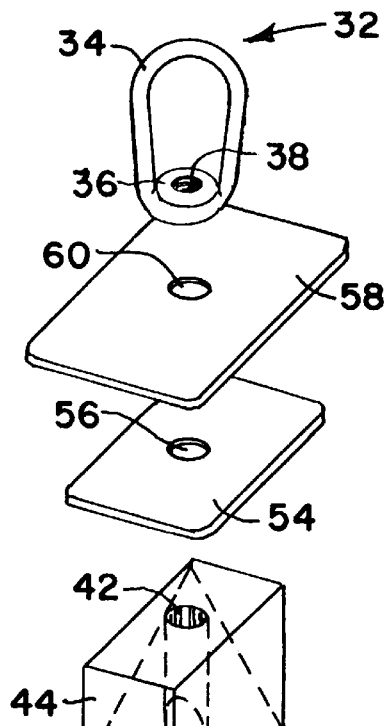
FIG. 3 is an exploded perspective view of a cargo tie-down device of this invention.

Referring to the drawings and particularly to FIGS. 2 and 3, there is illustrated a cargo tie-down device, generally designated by the numeral 10 and constituting the preferred embodiment of the present invention, being shown assembled in FIG. 2 and disassembled in FIG. 3. In such embodiment the illustrated cargo tie-down device 10 is removably disposable in a post receiving well (or stake hole) 12 of a cargo bed, load support, lading pallet, and the like.

IN FIG. 1 a motor vehicle 14 such as a pick-up truck is shown which is provided with a flat bed 16 from which a left side wall 18 and a right side wall 20 extend upwardly. The upper surface of side walls 18 and 20 are, in turn, provided by the truck manufacturer with a plurality of post receiving wells 12. Inserted into each one of two post receiving wells 12 of left side wall 18 and into each one of two post receiving wells 12 of right side wall 20 of motor vehicle 14 is a cargo tie-down device 10.

In order to secure a cargo 22 (shown in phantom) to flat bed 16 of motor vehicle 14, a plurality of straps (ropes, bands and the like) 24 are disposed about cargo 22 and the ends of each strap 24 are tightly tied to an end of a cargo tie-down device 10. As can more clearly be seen in FIG. 2, which is an enlarged partial view of FIG. 1, after a cargo tie-down device 10 is installed into post receiving well 12, it can remain therein or it can be removed therefrom.

In the exploded perspective view of a cargo tie-down device 10 as shown in FIG. 3, a rectangular-shaped first plate 26 has affixed centrally and perpendicularly thereto one end of an enlongated rod 28. The areal dimensions of plate 26 are somewhat less than the areal dimensions of post receiving well 12.

At its other end elongated rod 28 is machined with a plurality of helical threads 30. Threadably attachable to helical threads 30 is an eyenut 32 having an eyenut tie-down loop 34 that is perpendicularly and integrally affixed to an eyenut tie-down plate 36. Centrally located and therethrough eyenut tie-down plate 36 are a plurality of helical threads 38 for engaging helical threads 30 of elongated rod 28.

A generally solid parallelepipedon of a compressable polymeric material 40 has a passageway 42 that is longitudinally disposed throughout the center thereof. The diameter of passageway 42 is somewhat larger than the diameter of elongated rod 28.

Additionally, parallelepipedon of compressable polymeric material 40 is beveled so as to define a first movable wedge-shaped member 44 and a second wedge-shaped member 46 that is a mirror image of wedge-shaped member 44. The areal dimensions of the bottommost end of wedge-shaped member 46 is equal to the areal dimensions of first plate 26 and it is alignable therewith.

When parallelepipedon of compressable polymeric material 40 is beveled, each resulting wedge-shaped members 44 and 46 has an apex. Each apex is separated therefrom in order to provide a first enclosed space 48 whenever first wedge-shaped member 44 abuts second wedge-shaped member 46 in post receiving well 12. Similarly, whenever second wedge-shaped member 46 abuts first wedge-shaped member 44 in post receiving well 12, a second enclosed space 50 is formed.

The parallelepipedon of compressable polymeric material 40 is selected from the group consisting of natural rubber, synthetic rubber, polyurethane, and like compressable materials. Disposed between the end wall of first movable wedge-shaped member 44 opposing second movable wedge-shaped member 46 is a compatible lubricant film 52 selected from the group consisting of silicone greases.

Sitting atop first movable wedge-shaped member 44 is a rectangular-shaped second plate 54 whose areal dimensions are somewhat less than the areal dimensions of post receiving well 12. Rectangular-shaped second plate 54 has a centrally located passageway 56 whose diameter is somewhat larger than the diameter of enlongated rod 28.

Sitting atop rectangular-shaped second plate 54 is a rectangular third plate 58 whose areal dimensions are somewhat greater than the areal dimensions of post receiving well 12. Rectangular-shaped third plate 58 has a centrally located passageway 60 whose diameter is somewhat larger than the diameter of elongated rod 28.

Sitting atop rectangular-shaped third plate 58 is eyenut 32. As indicated hereinabove, at one end elongated rod 28 is machined with a plurality of helical threads 30 that are threadably attachable to helical threads of eyenut 32. A downwardly turning of eyenut 32 causes a longitudinal compression force to be applied to rectangular-shaped third plate 58 which in turn causes an outwardly expansion of parallelepipedon of compressable polymeric material 40.

Figure 4:
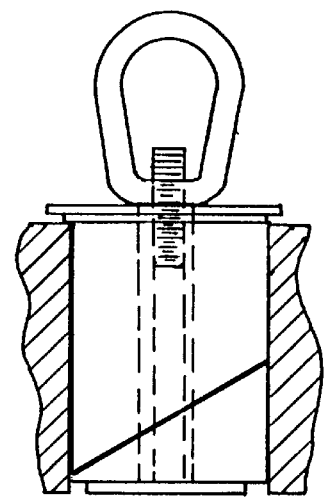
FIG. 4 is an elevational planar view of a first side of a cargo tie-down device of this invention installed in a post receiving well in a side wall of a motor vehicle prior to application of compressive force upon a block of expandable material.
Figure 6:
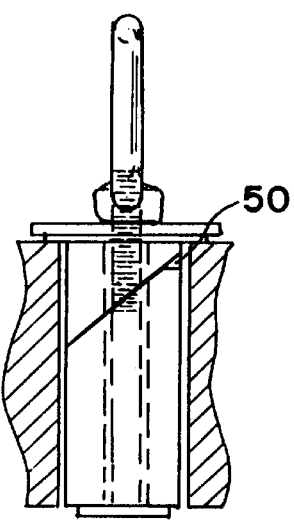
FIG. 6 is an elevational planar view of a second side of a cargo tie-down device of this invention installed in a post receiving well in a side wall of a motor vehicle prior to application of compressive force upon a block of expandable material.

In FIGS. 4 and 6 cargo tie-down device 10 is shown installed in post receiving well 12 in side wall 18 of motor vehicle 14 prior to application of compressive force upon parallelepipedon of compressable polymeric material 40. As is clearly shown in FIGS. 4 and 6, parallelepipedon of compressable material 40 is not in contact with the walls of post receiving well 18 of motor vehicle 14 and rectangular-shaped third plate 58 rests atop post receiving well 18. Also shown in FIG. 4 is first enclosed space 48 and FIG. 6 is second enclosed space 50.

Figure 5:
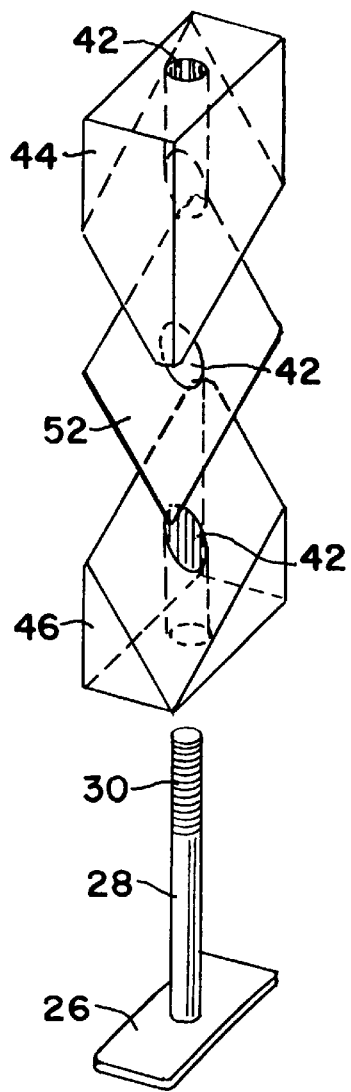
FIG. 5 is an elevational planar view of a first side of a cargo tie-down device of this invention installed in a post receiving well in a side wall of a motor vehicle after application of compressive force upon a block of expandable material.
Figure 7:
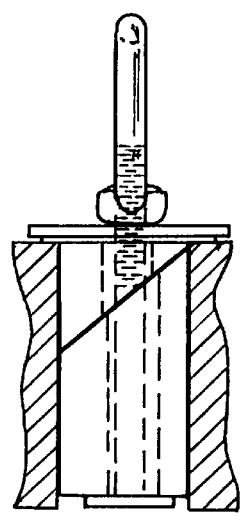
FIG. 7 is an elevational planar view of a second side of a cargo tie-down device of this invention installed in a post receiving well in a side wall of a motor vehicle after application of compressive force upon a block of expandable material.

In FIGS. 5 and 7 cargo tie-down device 10 is shown installed in post receiving well 12 in a side wall 18 of motor vehicle 14 after application of compressive force upon parallelepipedon of compressable polymeric material 40. As a consequence of a downwardly turning of eyenut 32, a longitudinal compressive force is applied to rectangular-shaped third plate 58 and second plate 54 which, in turn, is translated to parallelepipedon of compressable polymeric material 40. As a result thereof, parallelepipedon of compressable polymeric material 40 is caused to latitudinally expand in all outwardly directions so as to provide maximum surface high friction contact with the abutting walls of post receiving well 12. Upon application of sufficient turning of eyenut 32, tie-down device 10 is secured within post receiving well 12. Moreover, as parallelepipedon of compressable polymeric material 40 expands in all outwardly directions, first enclosed space 48 and second enclosed space 50 provide a relief chamber for compressed polymeric material 40.

In another embodiment of the present invention the outer walls of the compressable polymeric material are not smooth but are grooved like the threads of a pneumatic tire of a motor vehicle. Such design feature will further increase the securement of cargoes, loads, ladings, and the like to beds, supports, pallets, and the like.

Although preferred embodiments of the invention have been described, it will be understood that within the scope of this invention various changes may be made in the form, construction, and arrangement of the parts thereof without departing from the spirit and scope of the invention or sacrificing all of its material advantages, the form hereinabove described being merely a preferred or exemplary embodiment thereof.

The invention having been described, what I claim is:

1. A cargo tie-down device removably disposable in a post rereceiving well of a cargo bed comprising:

a generally solid parallelepipedon of a compressable polymeric material that is beveled to define a plurality of movable wedge-shaped members having rhomboid-shaped opposed end walls, said parallelepipedon being capable of latitudinal expansion in every outwardly direction in response to longitudinal compression that is applied thereto;

a compatible lubricant disposed between the rhomboid-shaped opposed end walls of the wedge-shaped members;

an eyenut bolt member for longitudinally compressing the parallelepipedon of compressable polymeric material, said member comprising a threaded shaft with a first plate being affixed to a first end of the shaft, a second plate with a centrally located hole being freely movable on the shaft, and an internally threaded eyenut being threadably movable on the shaft;

a hole longitudinally disposed throughout the center of the parallelepipedon of compressable polymeric material for receiving the shaft of the eyenut bolt member, said compressable polymerin material hole being sufficiently larger than the diameter of the shaft to allow for slippage of the wedge-shaped members along the lubricated end walls upon application of longitudinal compression;

said first plate being areally equal to—and alignable with a bottommost end of the parallelepipedon of compressable polymeric material and alugnable with an opening of the well of the cargo bed;

said second plate areally being somewhat larger than the topmost end of the parallelepipedon of compressable polymeric material, being somewhat larger than the well opening of the cargo bed, being disposed on the topmost end of the parallelepipedon of compressable polymeric material, and being disposed so that the threaded shaft passes through the centrally located hole of the second plate;

said internally threaded eyenut being disposed on the threaded shaft and atop the second plate so that a downwardly turning of the eyenut causes a longitudinal compression force to be applied to the second plate which in turn causes an outwardly expansion of the parallelepipedon of compressable polymeric material.

2. The cargo tie-down device of claim 1 wherein the parallelepipedon of compressable polymeric material is comprised of material selected from the group consisting of natural rubber, synthetic rubber, and polyurethane.

3. The cargo tie-down device of claim 1 wherein the compatible lubricant comprises a silicone grease.

4. The cargo tie-down device of claim 1 wherein the lubricant disposed between the rhomboid-shaped opposed end walls of the wedge-shaped members facilitates slippage of the wedge-shaped members along the lubricated end walls upon application of longitudinal compression.

5. The cargo tie-down device of claim 1 wherein apices of the wedge-shaped members are separated therefrom so as to provide relief chambers for compressed polymeric material.

6. The cargo tie-down device of claim 1 wherein outer walls of the parallelepipedon of compressable polymeric material are smooth.

7. The cargo tie-down device of claim 1 wherein outer walls of the parallelepipedon of compessable material are grooved.

8. The cargo tie-down device of claim 1 wherein the cargo tie-down device when installed into a post receiving well can be removed or remain therein.

9. The cargo tie-down device of claim 1 wherein means are provided for preventing the cargo tie-down from falling to the bottom of the post receiving well.

10. The cargo tie-down device of claim 1 wherein the device is configured such that a plurality of straps may be disposed around and about cargo and the ends thereof securely tied to the eyenut of said cargo tie-down device.

* * * * *